United States Patent
Ouyang (10) Patent No.: US 10,003,189 B2
(45) Date of Patent: Jun. 19, 2018

(54) PARALLEL-CONNECTED SEMICONDUCTOR DEVICES WITH CURRENT SHARING TECHNOLOGY AND CONTROL METHOD THEREOF

(71) Applicant: Hangzhou MPS Semiconductor Technology Ltd., Hangzhou (CN)

(72) Inventor: Qian Ouyang, Hangzhou (CN)

(73) Assignee: Hangzhou MPS Semiconductor Technology Ltd., Hangzhou (CN)

( * ) Notice: Subject to any disclaimer, the term of this patent is extended or adjusted under 35 U.S.C. 154(b) by 136 days.

(21) Appl. No.: 15/054,098

(22) Filed: Feb. 25, 2016

(65) Prior Publication Data

US 2017/0250604 A1     Aug. 31, 2017

(51) Int. Cl.
*H02M 3/158*       (2006.01)
*H02H 9/00*         (2006.01)
*G05F 1/59*          (2006.01)
*H02M 1/36*         (2007.01)

(52) U.S. Cl.
CPC ............... *H02H 9/004* (2013.01); *G05F 1/59* (2013.01); *H02M 1/36* (2013.01)

(58) Field of Classification Search
CPC ..... H02M 3/1584; H02M 3/158; H03K 17/06
See application file for complete search history.

(56) References Cited

U.S. PATENT DOCUMENTS

| | | | | |
|---|---|---|---|---|
| 5,157,269 A * | 10/1992 | Jordan | ...................... | G05F 1/59 307/31 |
| 5,592,394 A * | 1/1997 | Wiscombe | ................ | H02J 1/10 307/31 |
| 9,467,136 B1 * | 10/2016 | Nguyen | ............. | H03K 17/0822 |

* cited by examiner

*Primary Examiner* — Jue Zhang
*Assistant Examiner* — Jye-June Lee
(74) *Attorney, Agent, or Firm* — Perkins Coie LLP (57) ABSTRACT

A semiconductor device for limiting inrush current in hot-swap applications includes a power transistor and a current sensing circuit. The power transistor has a first terminal, a second terminal and a control terminal, wherein the first terminal is configured to receive an input voltage from a power supply, the second terminal is configured to provide an output voltage to a load, the control terminal is configured to receive a control voltage. Under regulation of the control voltage, the output voltage increases gradually towards the input voltage during a startup period and becomes substantially equal to the input voltage in a steady state. The current sensing circuit senses the current flowing through the power transistor and generates a current sensing signal. In order to achieve current balance, the control voltage is adjusted based on the relationship between the current sensing signal and current sensing signals of other semiconductor devices connected in parallel with the semiconductor device.

20 Claims, 8 Drawing Sheets

FIG. 1

(PRIOR ART)

FIG. 2

(PRIOR ART)

PARALLEL-CONNECTED SEMICONDUCTOR DEVICES WITH CURRENT SHARING TECHNOLOGY AND CONTROL METHOD THEREOF

TECHNICAL FIELD

The present invention generally relates to electrical circuits, and more particularly but not exclusively relates to semiconductor devices for limiting inrush current in hot-swap applications.

BACKGROUND

Efuses are widely used to prevent current from running away when an apparatus with bulk input capacitors (e.g. a removable PC card) is plugged into a live power supply. Generally, the Efuse is composed of a MOSFET coupled between the power supply and the apparatus, and a corresponding control circuit. At the very beginning of a plug-in event, the MOSFET is off and there is no current flowing through it. Then the gate-source voltage of the MOSFET ramps up slowly, and the current flowing through the MOSFET increases accordingly to charge the output voltage applied to the apparatus up to the input voltage provided by the power supply. This is so called startup period.

Figure 1:
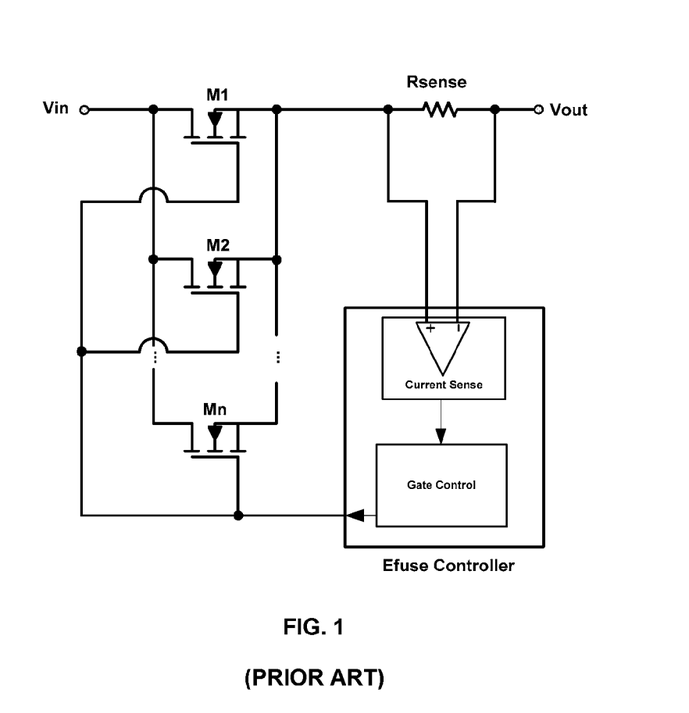
FIG. 1 shows a prior art Efuse with parallel-connected MOSFETs.
Figure 2:
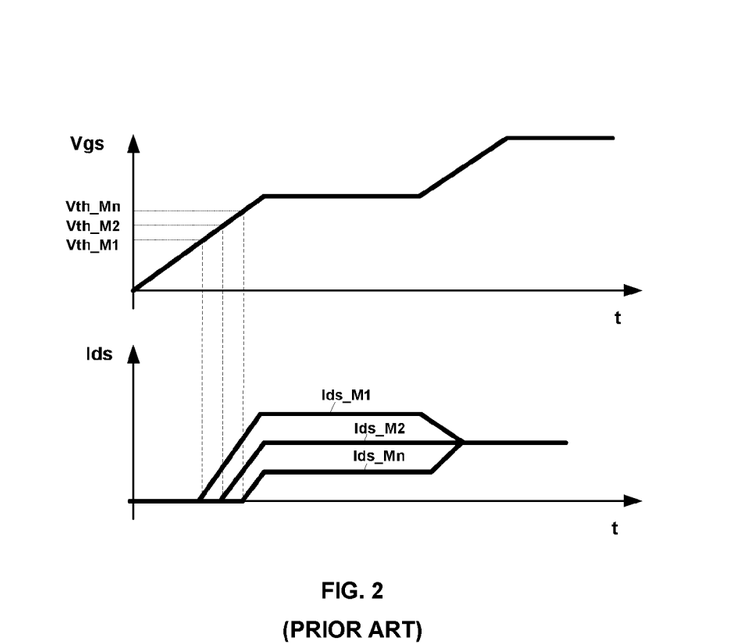
FIG. 2 provides working waveforms of the Efuse shown in FIG. 1.

In high current applications such as servers and telecom equipments, the Efuse has to handle a large current. Hence, users need to use several MOSFETs (M1~Mn) in parallel, such as shown in FIG. 1. This topology works well in steady state (when the startup has been finished and all the MOSFETS fully turn on), since the on-resistance of the MOSFET has a positive temperature co-efficiency which allows the plurality of MOSFETs to balance their current automatically. However, the story becomes entirely different in the startup period. As gate terminals of M1~Mn are tied together and powered by an Efuse controller shown in FIG. 1, the gate-source voltage of all the MOSFETs would ramp up in the same manner. If there is any variation at on-thresholds of these MOSFETs, a MOSFET with lower on-threshold will turn on earlier than the other ones, which will induce excessive stress on this MOSFET and probably cause it to be damaged, especially at high temperature. The current mismatch waveforms are shown in FIG. 2, wherein Ids indicates the current flowing through the MOSFET, Vth indicates the on-threshold and Vgs indicates the gate-source voltage.

SUMMARY

The embodiments of the present invention are directed to an electrical circuit, comprising: a plurality of power transistors connected in parallel, wherein each of the plurality of power transistors has a first terminal, a second terminal and a control terminal, and wherein the first terminal is configured to receive an input voltage from a power supply, the second terminal is configured to provide an output voltage to a load, the control terminal is configured to receive a control voltage, wherein under regulation of the plurality of control voltages, the output voltage increases gradually towards the input voltage during a startup period of the electrical circuit and becomes substantially equal to the input voltage in a steady state; and a plurality of current sensing circuits, wherein each of the plurality of current sensing circuit is configured to sense the current flowing through the corresponding power transistor and generate a current sensing signal; wherein the control voltages of the plurality of power transistors are adjusted based on the relationship between the plurality of current sensing signals, to balance the current flowing through the plurality of power transistors.

The embodiments of the present invention are also directed to a semiconductor device for coupling a load to a power supply, comprising: a power transistor having a first terminal, a second terminal and a control terminal, and wherein the first terminal is configured to receive an input voltage from the power supply, the second terminal is configured to provide an output voltage to the load, the control terminal is configured to receive a control voltage, wherein under regulation of the control voltage, the output voltage increases gradually towards the input voltage during a startup period and becomes substantially equal to the input voltage in a steady state; and a current sensing circuit configured to sense the current flowing through the power transistor and generate a current sensing signal; wherein the control voltage provide to the control terminal of the power transistor is adjusted based on the relationship between the current sensing signal and current sensing signals of other semiconductor devices connected in parallel with the semiconductor device, to achieve current balance among the parallel-connected semiconductor devices.

The embodiments of the present invention are further directed to a method for controlling a plurality of parallel-connected power transistors coupled between an input voltage and an output voltage. The control method comprises: generating a plurality of control voltages for respectively controlling the plurality of power transistors, to get the output voltage gradually increase towards the input voltage during a startup period and become substantially equal to the input voltage in steady state; respectively sensing the currents flowing through the plurality of power transistor and generate a plurality of current sensing signals; and adjusting the plurality of control voltages based on the relationship between the plurality of current sensing signals, to balance the current flowing through the plurality of power transistors.

BRIEF DESCRIPTION OF THE DRAWING

The present invention can be further understood with reference to the following detailed description and the appended drawings, wherein like elements are provided with like reference numerals. The drawings are only for illustration purpose. They may only show part of the devices and are not necessarily drawn to scale.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

To solve the problems mentioned in the background, embodiments of the present invention propose a solution wherein the current flowing through the multiple parallel-connected MOSFETs are respectively sensed and balanced. The gate-source voltage of each MOSFET is adjusted based on the relationship between the current flowing through the MOSFET and that of the other MOSFETs. Specifically, the current flowing through each MOSFET can be compared with a reference value to adjust the gate-source voltage of the MOSFET for current balance. The reference value might be equal to the current flowing through one of the MOSFETs, or the average value of the current flowing through the multiple MOSFETs. A semiconductor device integrating a MOSFET and a corresponding current sensing circuit is also introduced, which allows flexible parallel connection and easy expansion.

Figure 3A:
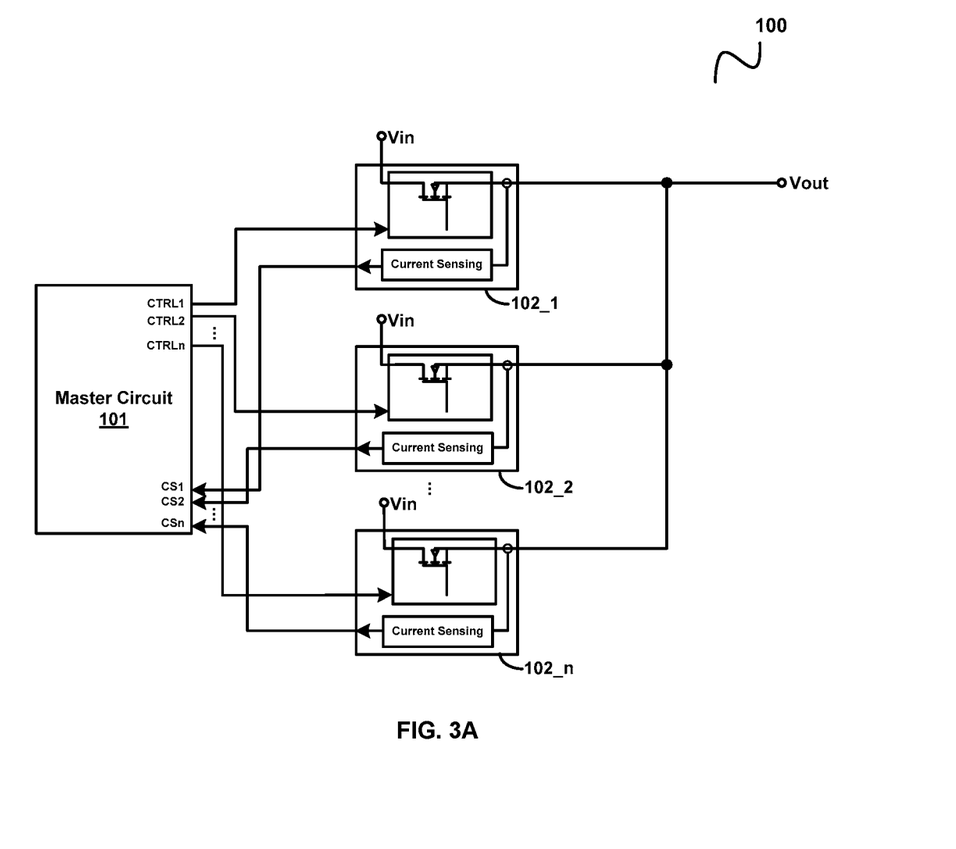
FIG. 3A illustrates a block diagram of an electrical circuit 100 with parallel-connected semiconductor devices in accordance with an embodiment of the present invention.

FIG. 3A illustrates a block diagram of an electrical circuit 100 with parallel-connected semiconductor devices in accordance with an embodiment of the present invention. The electrical circuit 100 is coupled between a power supply and a load, and is used to limit the inrush current in hot-swap applications. It comprises a master circuit 101 and a plurality of semiconductor devices 102_1-102_n. Each of the semiconductor devices includes a power transistor and a corresponding current sensing circuit. The power transistor has a drain terminal, a source terminal and a gate terminal, and wherein the drain terminal is configured to receive an input voltage Vin from the power supply, the source terminal is configured to provide an output voltage Vout to the load. The current sensing circuit is configured to sense the current flowing through the power transistor and generate a current sensing signal.

The master circuit 101 is coupled to the semiconductor devices 102_1~102_n. It receives the current sensing signals CS1~CSn, and generates the control signals CTRL1~CTRLn for adjusting the gate-source voltage Vgs (e.g., the rising slope of Vgs) of the power transistors in the semiconductor devices 102_1~102_n based on the relationship between the current sensing signals. For instance, if a current sensing signal is lower than the other ones, the master circuit 101 will increase the rising slope of the gate-source voltage of the power transistor with lower current to make its current catch up with others, and vice versa. Therefore, the current mismatch caused by the on-threshold variation is effectively avoided.

Figure 3B:
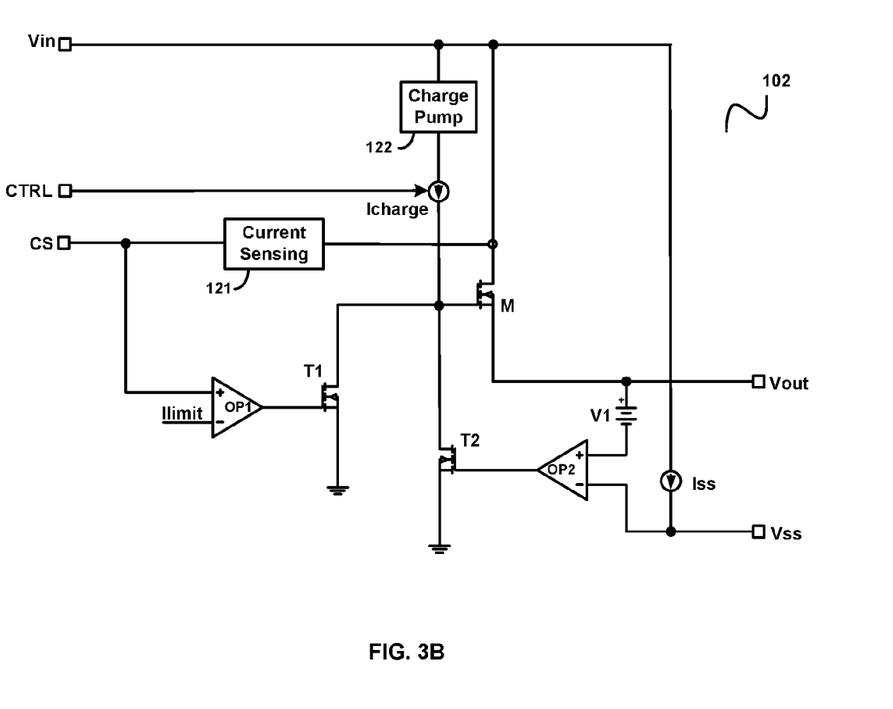
FIG. 3B schematically illustrates a semiconductor device 102 shown in FIG. 3A in accordance with an embodiment of the present invention.

FIG. 3B schematically illustrates a semiconductor device 102 shown in FIG. 3A in accordance with an embodiment of the present invention. The semiconductor device 102 includes a power transistor M, a current sensing circuit 121, current source Icharge, Iss, operational amplifiers OP1, OP2, and transistors T1, T2. The power transistor M has a drain terminal, a source terminal and a gate terminal, and wherein the drain terminal is configured to receive the input voltage Vin, the source terminal is configured to provide the output voltage Vout. The current sensing circuit 121 is configured to sense the current flowing through the power transistor M and generate a current sensing signal CS. The current sensing circuit 121 can be realized in current mirror, current sensing resistor or any other suitable circuits.

The current source Icharge has a first terminal and a second terminal, wherein the first terminal is coupled to the input voltage Vin (e.g. through a charge pump 122), the second terminal is coupled to the gate terminal of the power transistor.

The operational amplifier OP1 and the transistor T1 are used to limit the current flowing through the transistor M. The operational amplifier OP1 has a non-inverting input terminal, an inverting input terminal and an output terminal, wherein the non-inverting input terminal is coupled to current sensing circuit 121 to receive the current sensing signal CS, the second input terminal is configured to receive a current limit signal Ilimit. The transistor T1 has a drain terminal, a source terminal and a gate terminal, wherein the drain terminal is coupled to the gate terminal of the transistor M, the source terminal is coupled to a reference ground, the gate terminal is coupled to the output terminal of the operational amplifier OP1. Through the operational amplifier OP1 and the transistor T1, the current sensing signal CS is compared with the current limit signal Ilimit to regulate the gate-source voltage Vgs of the transistor M. The current limit signal Ilimit can be set to a relatively lower value during startup to ensure a controllable, gradual ramp up of the output voltage Vout. And then, it can be set to a relatively higher value in steady state to allow the load to sufficiently draw power from the power supply.

The current source Iss, operational amplifier OP2 and transistor T2 work together to provide a soft start function. The current source Iss has a first terminal and a second terminal, wherein the first terminal is coupled to the input voltage Vin. The operational amplifier OP2 has a non-inverting input terminal, an inverting input terminal and an output terminal, wherein the non-inverting input terminal is coupled to the output voltage Vout, the inverting input terminal is coupled to the second terminal of the current source Iss and a soft start capacitor located external of the semiconductor device 102. The transistor T2 has a drain terminal, a source terminal and a gate terminal, wherein the drain terminal is coupled to the gate terminal of the transistor M, the source terminal is coupled to the reference ground, the gate terminal is coupled to the output terminal of the operational amplifier OP2. As shown in FIG. 3B, a voltage source V1 is further coupled between the output voltage Vout and the non-inverting input terminal of the operational amplifier OP2 to disable the operational amplifier OP2 and the transistor T2 after the startup period.

During the startup period, the gate voltage at the gate terminal of the transistor M is charged by the current source Icharge, and the external soft start capacitor is charged by the current source Iss. Once the gate-source voltage Vgs of the transistor M reaches the on-threshold Vth, the transistor M starts to turn on. Owing to the operational amplifier OP2 and the transistor T2, the output voltage Vout would rise at a similar rate to the voltage across the soft start capacitor, until it becomes close to the input voltage Vin (e.g. larger than 90%*Vin).

As can be seen from FIG. 3B, the current source Icharge further has a control terminal configured to receive the control signal CTRL. Through the current source Icharge, the master circuit adjusts the gate-source voltage Vgs of the transistor M based on the relationship between the current sensing signal CS and the current sensing signals of the other semiconductor devices. Enlarging the current provided by the current source Icharge, the master circuit can increase the rising slope of the gate-source voltage Vgs of the transistor M, and vice versa.

In other embodiments, as an alternative, the master circuit can adjust the current limit signal Ilimit for current balance. If the master circuit detects that only one of the current sensing signals is zero, which means one MOSFET is off while the others are on, the master circuit will decrease the current limit signal Ilimit of all the semiconductor devices to a super low value (e.g. 3A), to minimize the current difference. Afterwards, when all the current sensing signals become larger than zero, the master circuit would alter the current limit signal to a higher value (e.g. 30A), so as to ensure a normal startup.

Figure 4A:
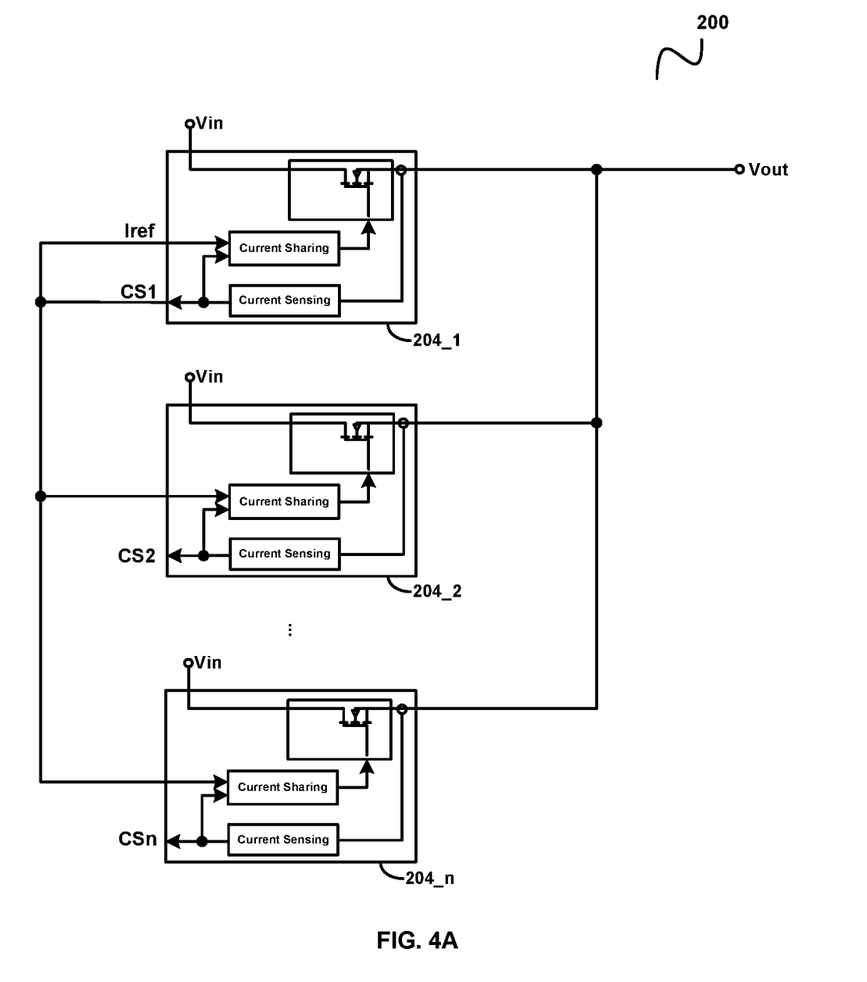
FIG. 4A illustrates a block diagram of an electrical circuit 200 with parallel-connected semiconductor devices in accordance with another embodiment of the present invention.

Although a master circuit is specifically involved in the embodiment of FIG. 3A for current balance, it is not used to limit the present invention. The current balance can also be achieved by sharing a reference signal, which is generated based on the plurality of current sensing signals, among the semiconductor devices. As shown in FIG. 4A, semiconductor devices 204_1~204_n all have a dedicated pin for receiving a reference signal Iref. Each semiconductor device includes a power transistor, a current sensing circuit for sensing the current flowing through the power transistor, and a current sharing circuit. The current sharing circuit is configured to adjust the gate-source voltage Vgs of the power transistor based on the comparison between the current sensing signal and the reference signal Iref, so as to regulate the current sensing signal to be equal to the reference signal Iref.

In the embodiment shown in FIG. 4A, the current sensing signal CS1 of the semiconductor device 204_1 is used as the reference signal Iref. However, it would be obvious to those skilled in the art that the current sensing signal of any other semiconductor device can also be chosen as the reference signal Iref.

Figure 4B:
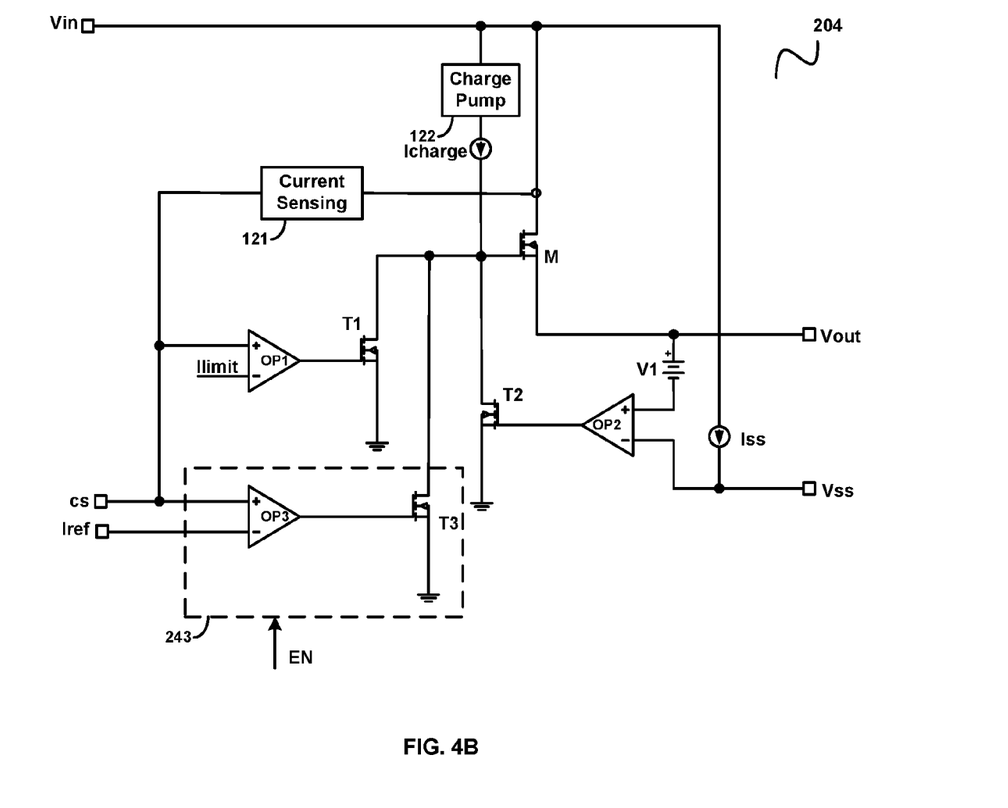
FIG. 4B schematically illustrates a semiconductor device 204 shown in FIG. 4A in accordance with an embodiment of the present invention.

FIG. 4B schematically illustrates a semiconductor device 204 shown in FIG. 4A in accordance with an embodiment of the present invention. Compared with the device 102 shown in FIG. 3B, the semiconductor device 204 further includes a current balancing circuit 243 which comprises an operational amplifier OP3 and a transistor T3. The operational amplifier OP3 has a non-inverting input terminal, an inverting input terminal and an output terminal, wherein the non-inverting input terminal is coupled to the current sensing circuit 121 to receive the current sensing signal CS, the inverting input terminal is configured to receive the reference signal Iref. The transistor T3 has a drain terminal, a source terminal and a gate terminal, wherein the drain terminal is coupled to the gate terminal of the transistor M, the source terminal is coupled to the reference ground, the gate terminal is coupled to the output terminal of the operational amplifier OP3.

The operational amplifier OP3 compares the current sensing signal CS with the reference signal Iref. If the current sensing signal CS is larger than the reference signal Iref, the operation amplifier OP3 will pull down the gate voltage of the transistor M through the transistor M3, thereby decrease the current flowing through the transistor M.

In some embodiments, the current balancing circuit 243 further receives an enable signal EA (e.g. from a comparator which compares the output voltage Vout with 90%*Vin). According to the enable signal EA, the current balancing circuit 243 is enabled during the startup period and disabled in the steady state.

Figure 5A:
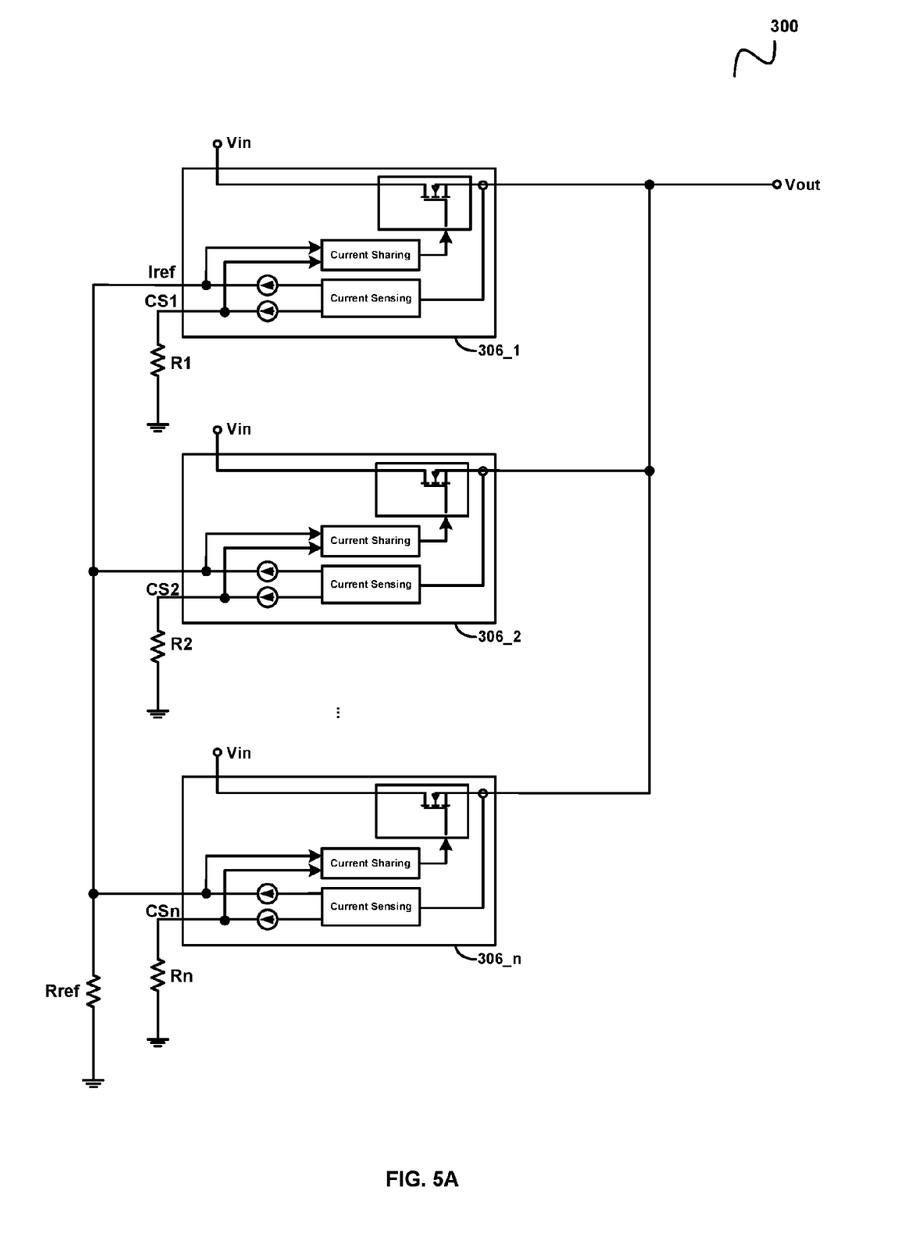
FIG. 5A illustrates a block diagram of an electrical circuit 300 with parallel-connected semiconductor devices in accordance with yet another embodiment of the present invention.

FIG. 5A illustrates a block diagram of an electrical circuit 300 with parallel-connected semiconductor devices in accordance with yet another embodiment of the present invention. In this embodiment, the average value of the current sensing signals CS1~CSn is utilized as the reference signal Iref. The current sensing circuit in each of the semiconductor devices 306_1~306_n generates two sensing current, with one provided to a corresponding external resistor Rk (k=1,2 . . . ,n) to generate the corresponding current sensing signal CSk and another provided to a common external resistor Rref to generate the reference signal Iref. The two sensing current are equal and the resistor Rref can be expressed as:

$$R_{ref} = \frac{R}{n} \quad (1)$$

Wherein R=R1=R2=. . . =Rn. Thus the reference signal Iref can be expressed as:

$$I_{ref} = \frac{CS_1 + CS_2 + \ldots + CS_n}{n} \quad (2)$$

Figure 5B:
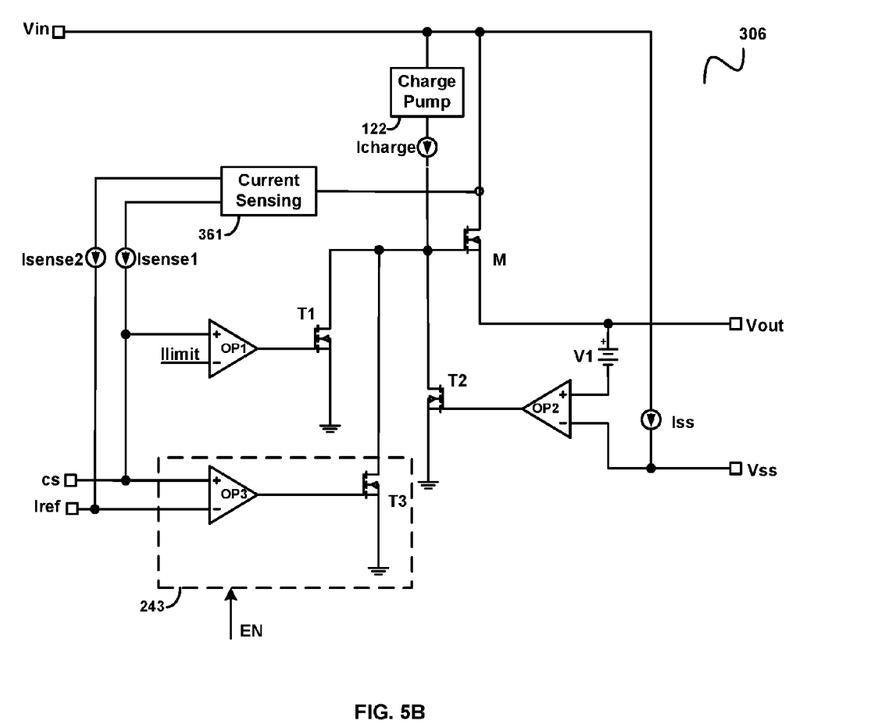
FIG. 5B schematically illustrates a semiconductor device 306 as shown in FIG. 5A in accordance with an embodiment of the present invention.

FIG. 5B schematically illustrates a semiconductor device 306 as shown in FIG. 5A in accordance with an embodiment of the present invention. As can be seen from the figure, the current sensing circuit 361 provides two sensing current Isense1 and Isense2. The sensing current Isense1 is configured to generate the current sensing signal CS across the corresponding external resistor, while the sensing current Isense2 is configured to generate the reference signal Iref across the common external resistor Rref.

Figure 6:
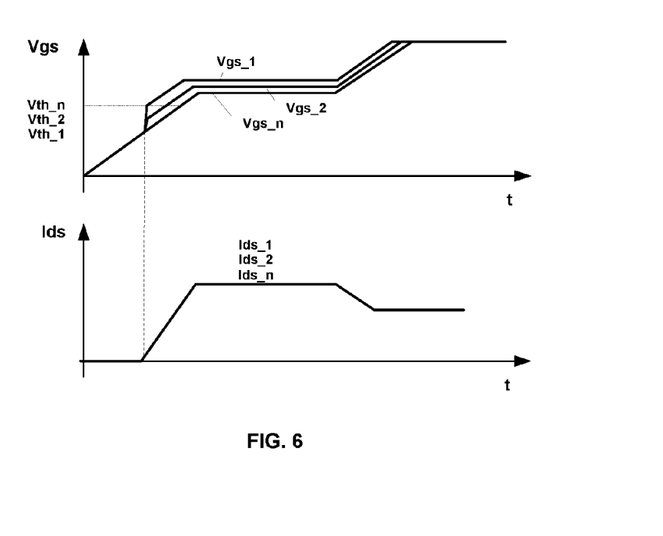
FIG. 6 illustrates working waveforms of the electrical circuit in accordance with embodiments of the present invention.

FIG. 6 illustrates working waveforms of the electrical circuit in accordance with embodiments of the present invention. It is apparent from the figure that the current Ids_1~Ids_n flowing though the semiconductor devices are well balanced.

Although the transistors in the embodiments above are all illustrated as MOSFETs, it would be apparent to people skilled in the relevant art that other transistors, such JFET, can also be utilized. Moreover, the number of the parallel-connected semiconductor devices might be various (2 or more) depending on the load. In some situations, the semiconductor device can even be used individually.

Figure 7:
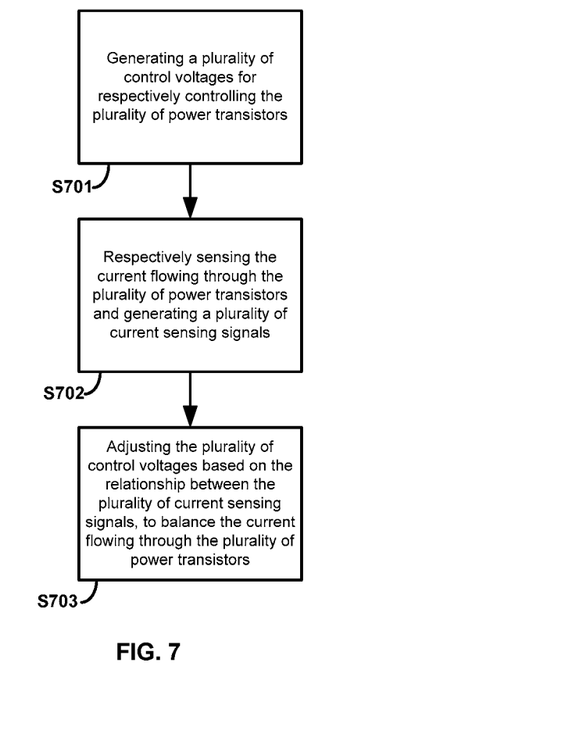
FIG. 7 is a working flowchart of a method for controlling a plurality of parallel-connected power transistors in accordance with an embodiment of the present invention.

FIG. 7 is a working flowchart of a method for controlling a plurality of parallel-connected power transistors coupled between an input voltage and an output voltage, in accordance with an embodiment of the present invention. It comprises steps S701~S703.

At step S701, a plurality of control voltages for respectively controlling the plurality of power transistors are generated, to get the output voltage gradually increase towards the input voltage during a startup period and become substantially equal to the input voltage in steady state.

At step S702, the current flowing through the plurality of power transistors are respectively sensed and a plurality of current sensing signals are generated.

At step S703, the plurality of control voltages are adjusted based on the relationship between the plurality of current sensing signals, so as to balance the current flowing through the plurality of power transistors Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. An electrical circuit, comprising:
   a plurality of power transistors connected in parallel, wherein each of the plurality of power transistors has a first terminal, a second terminal and a control terminal, and wherein the first terminal is configured to receive an input voltage from a power supply, the second terminal is configured to provide an output voltage to a load, the control terminal is configured to receive a control voltage, wherein under regulation of the plurality of control voltages, the output voltage increases gradually towards the input voltage during a startup period of the electrical circuit and becomes substantially equal to the input voltage in a steady state; and
   a plurality of current sensing circuits, wherein each of the plurality of current sensing circuit is configured to sense the current flowing through the corresponding power transistor and generate a current sensing signal;
   wherein the control voltages of the plurality of power transistors are adjusted based on the relationship between the plurality of current sensing signals, to balance the current flowing through the plurality of power transistors.

2. The electrical circuit of claim 1, wherein if the current sensing signal of a power transistor is lower than that of the other power transistors, the rising slope of the control voltage of the power transistor will be increased.

3. The electrical circuit of claim 1, further comprising:
   a master circuit coupled to the plurality of power transistors and current sensing circuits, wherein the master circuit receives the plurality of current sensing signals and generates a plurality of control signals for respectively adjusting the control voltages of the plurality of power transistors.

4. The electrical circuit of claim 1, wherein the control voltage of each of the plurality of power transistors is adjusted based on comparison between the corresponding current sensing signal and a reference signal, wherein the reference signal is equal to one of the plurality of current sensing signals or the average value of the plurality of current sensing signals.

5. The electrical circuit of claim 1, further comprising:
   a plurality of current sharing circuits, wherein each of the plurality of current sharing circuits compares a reference signal with the corresponding current sensing signal, and adjusts the control voltage of the corresponding power transistor based on the comparison result; and
   wherein the reference signal is equal to one of the plurality of current sensing signals or the average value of the plurality of current sensing signals.

6. The electrical circuit of claim 5, wherein each of the plurality of current sharing circuits includes:
   an operational amplifier having a first input terminal, a second input terminal and an output terminal, wherein the first input terminal is coupled to the corresponding current sensing circuit to receive the corresponding current sensing signal, the second input terminal is configured to receive the reference signal; and
   a transistor having a first terminal, a second terminal and a control terminal, wherein the first terminal is coupled to the control terminal of the power transistor, the second terminal is coupled to a reference ground, the control terminal is coupled to the output terminal of the operational amplifier.

7. The electrical circuit of claim 5, wherein the plurality of current sharing circuits are disabled in the steady state.

8. A semiconductor device for coupling a load to a power supply, comprising:
   a power transistor having a first terminal, a second terminal and a control terminal, and wherein the first terminal is configured to receive an input voltage from the power supply, the second terminal is configured to provide an output voltage to the load, the control terminal is configured to receive a control voltage, wherein under regulation of the control voltage, the output voltage increases gradually towards the input voltage during a startup period and becomes substantially equal to the input voltage in a steady state; and
   a current sensing circuit configured to sense the current flowing through the power transistor and generate a current sensing signal; wherein
   the control voltage provide to the control terminal of the power transistor is adjusted based on the relationship between the current sensing signal and current sensing signals of other semiconductor devices connected in parallel with the semiconductor device, to achieve current balance among the parallel-connected semiconductor devices.

9. The semiconductor device of claim 8, further comprising:
   a first current source having a first terminal and a second terminal, wherein the first terminal is coupled to the input voltage, the second terminal is coupled to the control terminal of the power transistor.

10. The semiconductor device of claim 8, further comprising:
    a first operational amplifier having a first input terminal, a second input terminal and an output terminal, wherein the first input terminal is coupled to current sensing circuit to receive the current sensing signal, the second input terminal is configured to receive a current limit signal; and a first transistor having a first terminal, a second terminal and a control terminal, wherein the first terminal is coupled to the control terminal of the power transistor, the second terminal is coupled to a reference ground, the control terminal is coupled to the output terminal of the first operational amplifier.

11. The semiconductor device of claim 10, wherein the current limit signal is set to a lower value during the startup period and a higher value in the steady state.

12. The semiconductor device of claim 8, further comprising:
  a second current source having a first terminal and a second terminal, wherein the first terminal is coupled to the input voltage;
  a second operational amplifier having a first input terminal, a second input terminal and an output terminal, wherein the first input terminal is coupled to the output voltage, the second input terminal is coupled to the second terminal of the second current source and an external capacitor; and
  a second transistor having a first terminal, a second terminal and a control terminal, wherein the first terminal is coupled to the control terminal of the power transistor, the second terminal is coupled to a reference ground, the control terminal is coupled to the output terminal of the second operational amplifier.

13. The semiconductor device of claim 12, further comprising:
  a voltage source having a first terminal and a second terminal, wherein the first terminal is coupled to the output voltage, the second terminal is coupled to the first input terminal of the second operational amplifier.

14. The semiconductor device of claim 8, wherein if the current sensing signal is lower than the current sensing signals of other semiconductor devices, the rising slope of the control voltage will be increased.

15. The semiconductor device of claim 8, further comprising:
  a current sharing circuit configured to compare a reference signal with the current sensing signal, and adjust the control voltage of the power transistor based on the comparison result, wherein the reference signal is equal to one of the current sensing signals of the parallel-connected semiconductor devices, or the average value of the current sensing signals of the parallel-connected semiconductor devices.

16. The semiconductor device of claim 15, wherein the current sharing circuit includes:
  a third operational amplifier having a first input terminal, a second input terminal and an output terminal, wherein the first input terminal is coupled to the current sensing circuit to receive the current sensing signal, the second input terminal is configured to receive the reference signal; and
  a third transistor having a first terminal, a second terminal and a control terminal, wherein the first terminal is coupled to the control terminal of the power transistor, the second terminal is coupled to a reference ground, the control terminal is coupled to the output terminal of the third operational amplifier.

17. The semiconductor device of claim 15, wherein the current sharing circuit is disabled in the steady state.

18. A method for controlling a plurality of parallel-connected power transistors coupled between an input voltage and an output voltage, comprising:
  generating a plurality of control voltages for respectively controlling the plurality of power transistors, to get the output voltage gradually increase towards the input voltage during a startup period and become substantially equal to the input voltage in steady state;
  respectively sensing the currents flowing through the plurality of power transistor and generate a plurality of current sensing signals; and
  adjusting the plurality of control voltages based on the relationship between the plurality of current sensing signals, to balance the current flowing through the plurality of power transistors.

19. The control method of claim 18, wherein if the current sensing signal of a power transistor is lower than that of the other power transistors, the control voltage of the power transistor will be increased.

20. The control method of claim 18, wherein each of the plurality of control voltages is adjusted based on comparison between the corresponding current sensing signal and a reference signal, wherein the reference signal is equal to one of the plurality of current sensing signals or the average value of the plurality of current sensing signals.

* * * * *